(12) United States Patent
Vanderhoof et al.

(10) Patent No.: US 6,593,525 B1
(45) Date of Patent: Jul. 15, 2003

(54) DIRECT BURIAL OUTDOOR MEMBRANE PRESSURIZATION SYSTEM

(75) Inventors: Troy Inslee Vanderhoof, Plano, TX (US); Brian Douglas Cross, Double Oak, TX (US); John Michael Curry, Plano, TX (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 10/090,539

(22) Filed: Mar. 4, 2002

(51) Int. Cl.[7] .................................................. H02G 3/08
(52) U.S. Cl. ........................... 174/50; 60/208; 60/211; 220/581
(58) Field of Search ........................... 174/50; 60/208, 60/211; 220/581

(56) References Cited

U.S. PATENT DOCUMENTS

| | | | |
|---|---|---|---|
| 2,953,625 A | 9/1960 | Hasselhorn | 174/60 |
| 3,466,379 A | 9/1969 | Lohman | 174/38 |
| 3,531,010 A | 9/1970 | Handley et al. | 220/40 |
| 3,557,299 A | 1/1971 | Dienes | 174/38 |
| RE27,898 E | 1/1974 | Baumgartner | 174/38 |
| 3,864,510 A | 2/1975 | Ramsey, Jr. et al. | 174/38 |
| 4,097,683 A | 6/1978 | Summers | 174/38 |
| 4,133,021 A * | 1/1979 | King et al. | 174/38 |
| 4,183,601 A | 1/1980 | Barber et al. | 339/44 R |
| 4,243,834 A | 1/1981 | Logioco | 174/38 |
| 4,332,530 A * | 6/1982 | Laster | 417/130 |
| 4,536,611 A | 8/1985 | Butler | 174/41 |
| 4,622,436 A | 11/1986 | Kinnan | 174/77 |
| 4,631,353 A * | 12/1986 | Marks | 174/16.1 |
| 4,709,120 A * | 11/1987 | Pearson | 174/16.1 |
| 4,709,980 A | 12/1987 | Coll et al. | 350/96.2 |
| 4,884,863 A | 12/1989 | Throckmorton | 350/96.2 |
| 5,030,251 A | 7/1991 | Rice et al. | 55/16 |
| 5,082,471 A | 1/1992 | Athahyde et al. | 55/16 |
| 5,216,577 A * | 6/1993 | Schilling | 165/45 |
| 5,470,379 A | 11/1995 | Garrett | 96/4 |
| 5,496,388 A | 3/1996 | Tellier | 55/210 |
| 5,620,500 A | 4/1997 | Fukui et al. | 95/52 |
| 5,632,805 A | 5/1997 | Woodard | 96/4 |
| 5,641,337 A | 6/1997 | Arrowsmith et al. | 95/39 |
| 5,665,146 A | 9/1997 | Mizobe | 96/7 |
| 5,711,882 A | 1/1998 | Hofmann et al. | 210/640 |
| 5,730,780 A | 3/1998 | Booth, III | 95/51 |
| 5,753,009 A | 5/1998 | Sirkar et al. | 95/45 |
| 5,755,855 A | 5/1998 | Baker et al. | 95/39 |
| 5,985,005 A | 11/1999 | Mizobe | 96/7 |
| 5,985,151 A | 11/1999 | Ahmadi | 210/650 |
| 6,019,822 A | 2/2000 | Kanzawa et al. | 96/8 |
| 6,027,546 A * | 2/2000 | Kusters et al. | 95/113 |
| 6,036,746 A | 3/2000 | Scovazzo et al. | 95/52 |
| 6,070,339 A | 6/2000 | Cunkelman | 34/79 |
| 6,077,436 A | 6/2000 | Rajnik et al. | 210/650 |
| 6,077,446 A * | 6/2000 | Steiner et al. | 210/192 |
| 6,126,721 A * | 10/2000 | Nemser et al. | 95/54 |
| 6,128,825 A | 10/2000 | Cunkelman | 34/79 |
| 6,156,096 A | 12/2000 | Sirkar | 95/44 |
| 6,170,804 B1 * | 1/2001 | Allen | 254/134.4 |
| 6,220,245 B1 | 4/2001 | Takabayashi et al. | 128/205.12 |
| 6,228,146 B1 | 5/2001 | Kuespert | 95/46 |
| 6,248,153 B1 | 6/2001 | Braun et al. | 95/45 |
| 6,251,344 B1 | 6/2001 | Goldstein | 422/123 |
| 6,273,937 B1 | 8/2001 | Schucker | 95/45 |
| 6,309,448 B1 | 10/2001 | Mizobe | 96/7 |

* cited by examiner

Primary Examiner—Dean A. Reichard
Assistant Examiner—Anton Harris
(74) Attorney, Agent, or Firm—Wood, Herron & Evans, LLP

(57) ABSTRACT

A system configured to deliver dry pressurized air, derived from ambient air, to underground or outdoor cables, conduit, waveguides, plenums or other air spaces for the purpose of preventing the ingress of moisture or contamination. The system includes a housing and a modular membrane pressurization unit removably received within an interior space of the housing. The housing has a base configured for being at least partially buried below ground level and an air intake above ground level. The modular membrane pressurization unit intakes humid ambient air from the environment surrounding the housing and generates a continuous supply of dry pressurized air housing that is routed to the underground air space.

23 Claims, 8 Drawing Sheets

DIRECT BURIAL OUTDOOR MEMBRANE PRESSURIZATION SYSTEM

FIELD OF THE INVENTION

This invention relates generally to systems designed to supply dry pressurized air, and more particularly to systems designed to supply dry pressurized air to underground or outdoor cables, conduit, waveguides, plenums or other air spaces for the purpose of preventing the ingress of moisture or contamination.

BACKGROUND OF THE INVENTION

Underground air spaces for communications systems, such as cables, conduits, waveguides, and other air plenums, are susceptible to condensation of water vapor from the enclosed air due to variations in temperature and humidity. Typically, a humidity level of significantly less than the ambient dew point is desired in such underground air spaces. To prevent the accumulation of moisture due to elevated humidity levels, the underground air space is normally sealed and pressurized to prevent the ingress or infiltration of moisture-laden ambient air through any small gaps or openings in the confining structure of the air space.

The dry pressurization is currently accomplished in one of several ways. Perhaps, the most common approach utilizes bottles or canisters containing a fixed volume of a pressurized dry gas, such as nitrogen. In this approach, a compressed gas container or bottle is placed above ground adjacent to a manhole that provides underground access to the underground air space. An exposed gas line is extended from the bottle through the manhole access and connected in fluid communication with the underground air space. Dry gas from the bottle provides a positive pressure of a dry pressurized gas that prevents or significantly reduces the ingress of moisture or contamination into the underground airspace.

The use of pressurized bottles has several deficiencies. First and foremost, is the issue of safety. Underground air spaces for communications systems are often located in easements proximate to busy thoroughfares. Gas bottles may be pressurized to internal pressures as great as 3,000 pounds per square inch (psi). Locating such highly pressurized bottles with exposed lines next to busy thoroughfares creates the possibility that a vehicle will strike a gas bottle, causing an explosion, or at least damage the exposed gas line coupling the bottle with the underground air space.

Another significant deficiency of pressurized bottles is that of capacity. Pressurized bottles have a limited capacity for providing continued pressurization based on their size and pressurization. Despite pressurization to significant internal pressures, the supply of dry gas contained in gas bottles of conventional capacity is intermittently depleted. Therefore, the gas bottles must be exchanged periodically to continually provide pressurization.

Another approach to dry pressurization relies on pole-mounted devices that include a dehumidifier or dehydrator to remove moisture from the humid ambient air and a compressor that pressurizes dried air, and the dehumidifying apparatus removes moisture from the pressurized air. The low moisture content of the dried air lowers its dew point so that condensation is unlikely to occur. Among the various types of dehydrators are pressure swing absorption dehydrators and desiccant dehydrators. Although this approach eliminates the dangers associated with pressurized gas bottles, there remain the problems of exposed lines and having to service the device atop the pole in order provided continuous dry pressurization.

Therefore, it would be desirable to have a device that provides dry pressurized air from humid ambient air with lengthened service intervals for pressurizing underground air spaces.

DETAILED DESCRIPTION OF THE INVENTION

Although the invention will be described next in connection with certain preferred embodiments, it will be understood that the invention is not limited to those particular embodiments. On the contrary, the description of the invention is intended to cover all alternatives, modifications, and equivalent arrangements as may be included within the spirit and scope of the invention as defined by the appended claims.

The present invention provides a system for supplying dry pressurized air and, more particularly, a membrane pressurization system for supplying dry pressurized air to underground or outdoor cables, conduit, waveguides, plenums or other air spaces that overcomes the drawbacks and disadvantages of conventional techniques for supplying dry pressurized air to underground air spaces. According to the principles of the present invention, dry pressurized air is generated by intaking ambient air from above a ground surface and passing the ambient air through a membrane separator to remove moisture to provide dry air having a reduced moisture level from the ambient air. The dry air is then directed below the ground surface to an underground air space.

The system and method of the present invention converts humid ambient air directly into clean and dry pressurized air so that pressurized nitrogen bottles are not required to provide positive pressurization of below-ground air spaces. In addition, the system of the present invention may be at least partially buried in the ground or placed on a platform at ground level so that pole mounting is not required.

Figure 1:
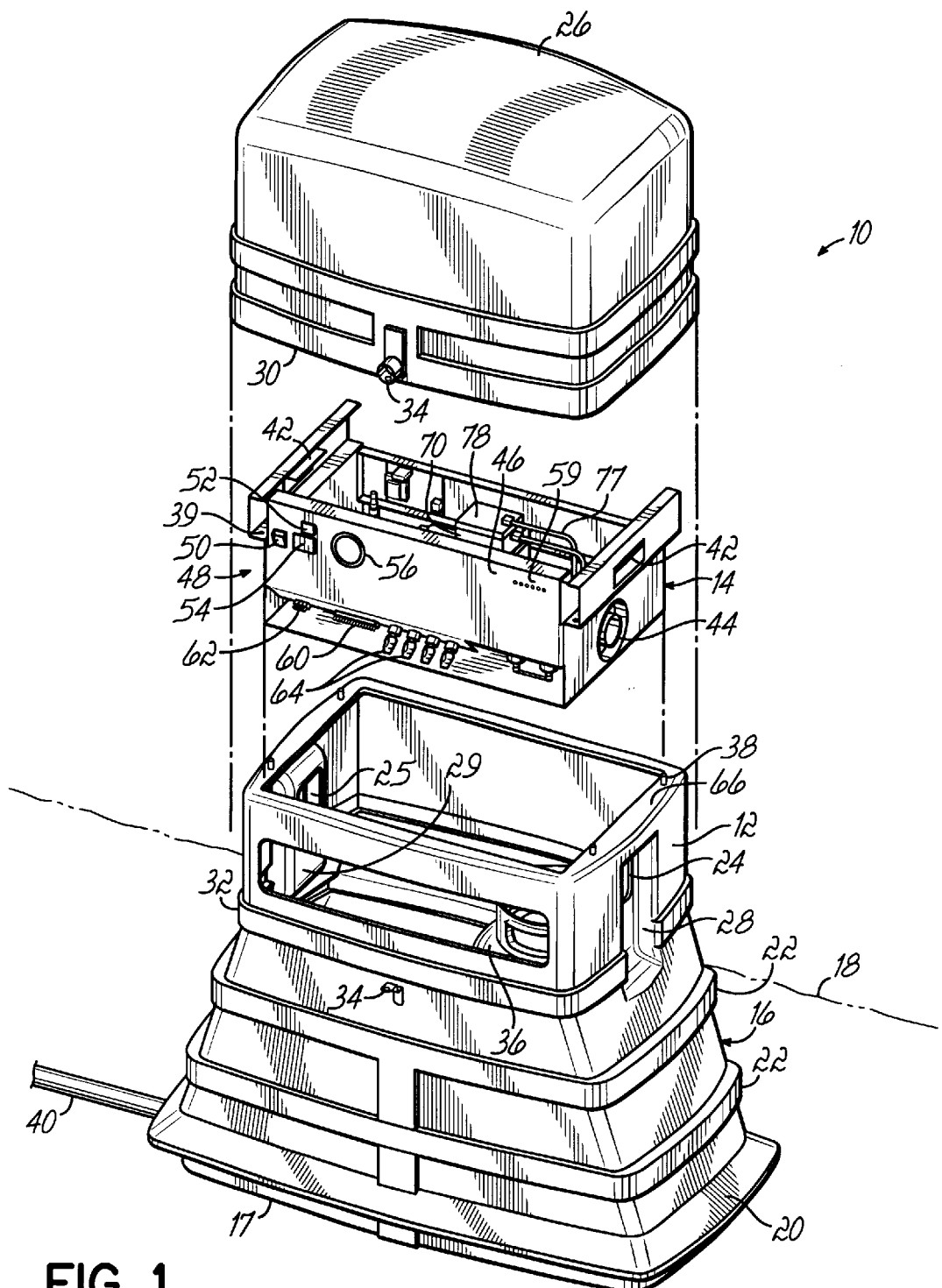
FIG. 1 illustrates a partially-disassembled, perspective view of an embodiment of a membrane pressurization system in accordance with aspects of the present invention.
Figure 2:
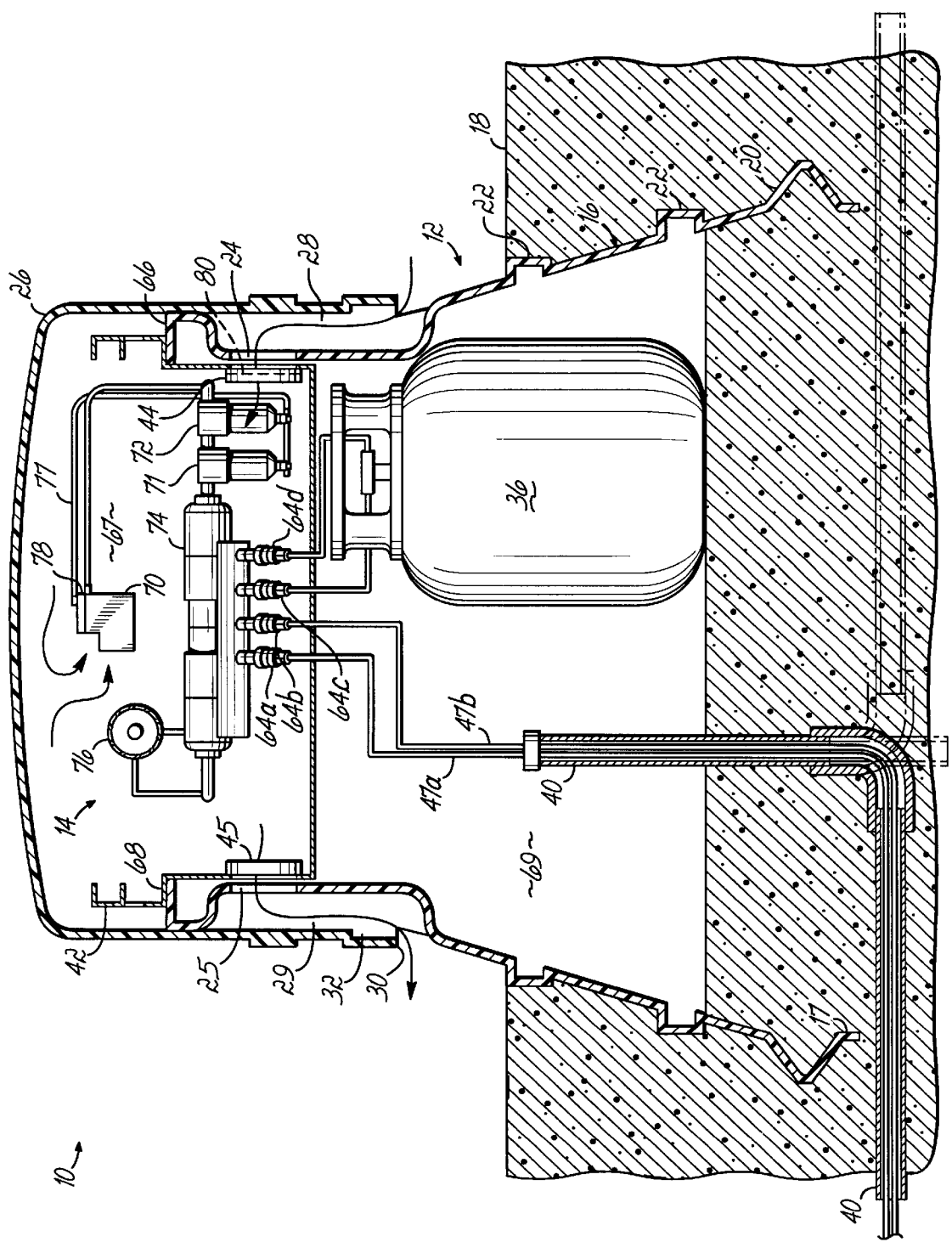
FIG. 2 is side sectional view of the system of FIG. 1.
Figure 3:
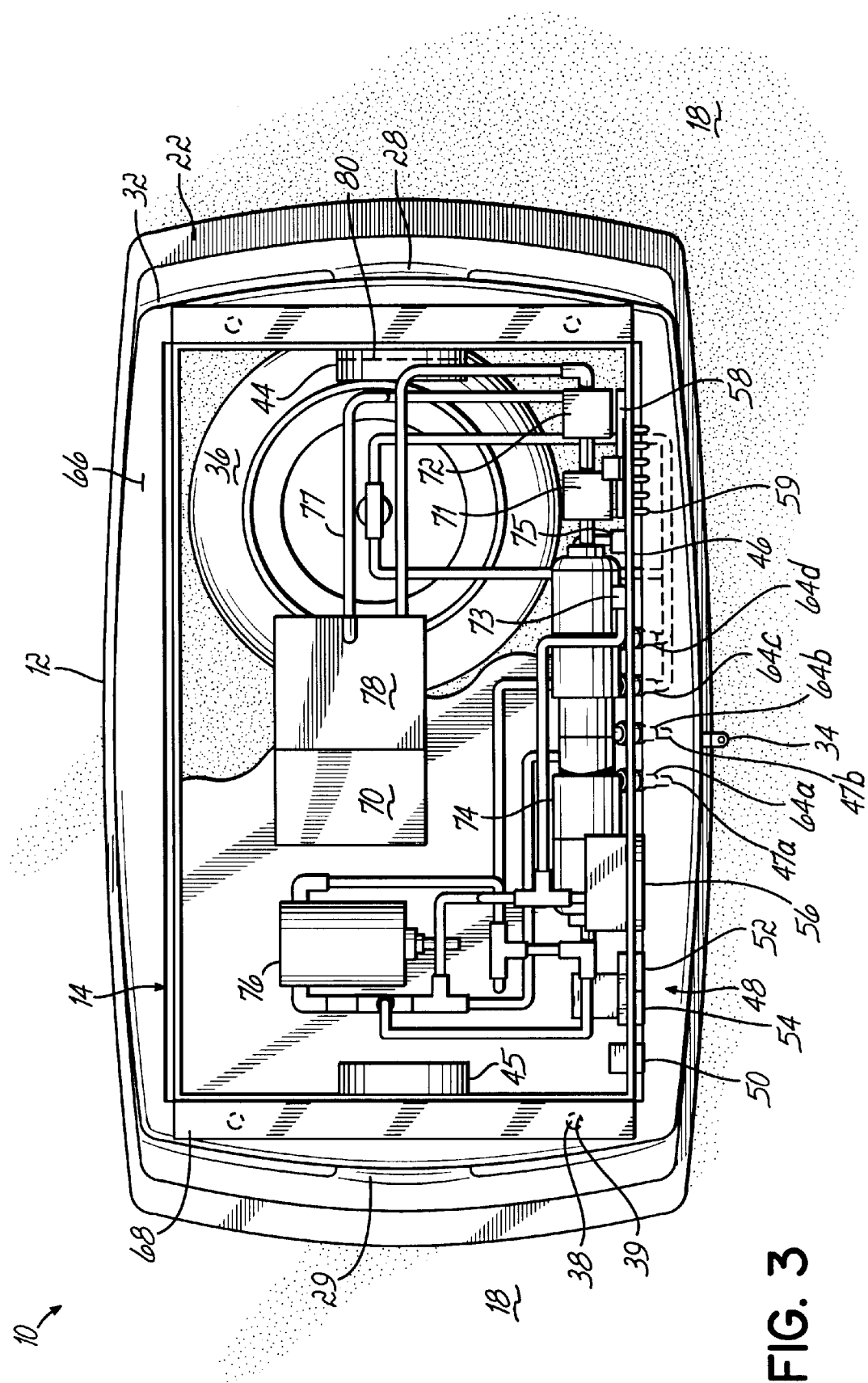
FIG. 3 is a top sectional view of the system of FIG. 1 shown with the cover removed from the base.

With reference to FIGS. 1–3, a membrane pressurization system 10 in accordance with an embodiment of the present invention is shown. The system 10 comprises a housing 12 and a modular membrane pressurization unit 14 disposed within the interior of housing 12. The housing 12 may be constructed from any suitable thermoplastic resin, such as low density polyethylene (LDPE), polypropylene (PP), or acrylonitrile butadiene styrene (ABS), using a conventional molding method. The housing 12 includes a base 16 configured for being at least partially buried below the plane of a ground surface 18. The base 16 extends beneath the ground surface 18 and has an open bottom 17 that affords access to the space within housing 12 from beneath the ground surface 18. The diameter of the buried portion of base 16 increases with increasing penetration depth beneath the ground surface 18 so as to flare outwardly in a bell shape. Base 16 also includes a plurality of, for example, two circumferential ribs 22 to add strength and stability when the base 16 is buried and to aid in securing the base 16 in the ground. Other configurations for the buried portion of base 16 are contemplated by the present invention, such as omitting ribs 22 or shaping the buried portion of base 16 as an open-ended cylinder of uniform diameter.

Handholds 42 are formed in a portion of the modular membrane pressurization unit 14 and are used to remove the modular membrane pressurization unit 14 from the housing 12 as a unit. The base 16 includes locating structure 38, more specifically a plurality of pins, and the modular membrane pressurization unit 14 includes a locating structure 39 complementary to locating structure 38, more specifically a corresponding plurality of holes adapted and dimensioned to receive the pins. The locating structures 38, 39 make the modular membrane pressurization unit 14 self-locating when unit 14 is placed in the base 16. Different locating structures 38, 39 are contemplated by the present invention, such as placing the holes on base 16 and positioning complementary pins on modular membrane pressurization unit 14. The handholds 42 and the locating structures 38, 39 cooperate to permit accurate and reproducible manual placement of the modular membrane pressurization unit 14 in the base 16.

With continued reference to FIGS. 1–3, an interior ledge 66 is formed about the interior circumference of the base 16. The ledge 66 provides a support surface for supporting the modular membrane pressurization unit 14 when unit 14 is positioned inside housing 12. The modular membrane pressurization unit 14 has a corresponding lip 68 about the perimeter of the unit 14 upon which the unit 14 rests when placed in the base 16. The contact between the ledge 66 and lip 68 forms a seal between the modular membrane pressurization unit 14 and base 16 that isolates an upper compartment 67 of the housing 12 from a lower compartment 69 of the housing 12.

With continued reference to FIGS. 1–3, the housing 12 further includes an air intake 24 to intake ambient air into upper compartment 67 of housing 12 and an air exhaust 25 to exhaust ambient air from upper compartment 67, and a cover 26 that closes an access opening into upper compartment 67. The cover 26 is designed and dimensioned to fit over and overlap an upper portion of the base 16. A lip 30 on the bottom edge of the cover 26 mates with a horizontal rib 32 on the base 16 to create a stepped sealed plane around the perimeter of the housing 12. This seal between the lip 30 and rib 32 enhances the intake and exhaust of air through air scoops 28, 29. A locking mechanism 34, such as a tamper resistant padlock assembly, may be provided for securing the cover 26 to the base 16.

A side portion of cover 26 forms a shielded vent or air scoop 28 that prevents or significantly reduces the entry of contamination, such as wind-blown rain or other wind-borne debris, through the air intake 24 into the interior of housing 12. An opposite side portion of cover 26 includes an air scoop 29 that similarly prevents or significantly reduces the entry of contamination into air exhaust 25. The air scoops 28, 29 may be integral with the housing 12 or, optionally, may be formed as separate components that are later affixed to the housing 12.

With continued reference to FIGS. 1–3, the modular membrane pressurization unit 14 includes a pair of air moving devices 44, 45, a compressor 70, a pair of in-line filters 71, 72, a membrane dryer 74, a pressure sensor 73, a pressure switch 75, and a pressure regulator 76. Air moving device 44 is associated in a sealing engagement with the air intake 24 when the modular membrane pressurization unit 14 is housed in the housing 12. Air moving device 44 draws ambient air from above the surrounding environment above ground surface 18 into the upper compartment 67 of housing 12 through air scoop 28 and air intake 24. A filter element 80 is provided with a filter medium suitable to remove particulate matter from the ambient air entering the air intake 24 so as to restrict particulate entry into the upper compartment 67. Air moving device 45 is associated in a sealing engagement with air exhaust 25 and is operative to exhaust ambient air from the upper compartment 67 of housing 12 through air exhaust 25 and air scoop 29. Air moving devices 44, 45 may each be any device, such as a blower or a fan, capable of creating a volumetric flow of air. It is appreciated that air moving device 45 may be omitted without departing from the spirit and scope of the present invention.

The compressor 70 provides a source of compressed or pressurized ambient air. To that end, the compressor 70 includes a reciprocating or rotary pump (not shown) that draws ambient air present at atmospheric pressure and ambient moisture content or humidity in upper compartment 67 into an inlet side of compressor 70 and supplies a compressed stream of ambient air from an outlet side of compressor 70 to an inlet side of filters 71, 72. The directional flow of ambient air induced by air moving devices 44, 45 between the air intake 24 and air exhaust 25 maintains positive air flow across the compressor 70, at least partially due to the upper compartment 67 of the housing 12 being sealed off from the lower compartment 69 of the housing 12 as described above. Additionally, the air flow convectively cools compressor 70.

The pressure sensor 73 is operative to provide low pressure alarm functionality that indicates the presence of leaks in the underground air space being pressurized. Compressor 70 does not need to operate continuously in order to effectively dehumidify the dry pressurized air flowing to the underground air space, which is typically sealed to control leakage. To that end, the pressure switch 75 is used to control the on/off duty cycles of the operation of compressor 70 according to the system pressure. Although in this exemplary embodiment compressor control is initiated and controlled by pressure switch 75 that is pneumatic, those skilled in the art will readily understand that this control function can be realized many different ways. For example, an electronic controller could automatically activate an electronic switch to initiate operation of compressor 70 with an electrical control signal in accordance with a predetermined control algorithm.

With continued reference to FIGS. 1–3, the filters 71, 72 are operative to reduce the moisture level and remove particulate matter from the stream of compressed ambient air. Condensed moisture from the humid ambient air is collected as water by the filters 71, 72 and is transmitted through a drain line 77 to an evaporation tray 78 located on top of compressor 70. The evaporation tray 78 has a good thermal contact with an exterior portion of the compressor 70 to promote heat transfer therebetween. Heat generated by the compressor 70 during operation warms the evaporation tray 78 so that the collected water in tray 78 is periodically evaporated. The evaporation tray 78 provides a convenient method of disposing of water collected in filters 71, 72 and does not require an external fluid flow path extending to the exterior of housing 12.

The membrane dryer 74 receives the compressed air stream from the filters 71, 72. The flow rate through the membrane dryer 74 is regulated by controlling the compressor 70 so that unwanted gas species, such as water vapor, are efficiently filtered out. The membrane dryer 74 includes one or more membranes operative for removing a portion of the remaining water molecules in the air stream, as well as other gaseous species including oxygen. Water vapor, in particular, efficiently permeates the porous membrane walls of membrane dryer 74 and is trapped or collected as a liquid for subsequent exhaust to the surrounding environment. As a result, membrane dryer 74 removes residual moisture from the air stream that remains after the filtering action of filters 71, 72, which provides a flow of clean dry pressurized air exiting the outlet side of the membrane dryer 74. The humidity level of the dry pressurized air exiting the outlet side of the membrane dryer 74 is significantly less than the ambient dew point.

A portion of the dry pressurized air is distributed from the outlet of the membrane dryer 74 to an adjustable flow controller, such as pressure regulator 76, and another portion is delivered to an air reservoir 36. The air reservoir 36, also positioned inside housing 12, stores a volume of the dry compressed air and functions as an accumulator, as will be discussed herein. A variety of air tanks well known in the art may be used for air reservoir 36. The pressure regulator 76 delivers dry pressured air at a controlled air pressure to fittings 64a, 64b.

The fittings 64a, 64b, and fittings 64c and 64d described below, may be any quick disconnect fluid fittings suitable for use with flexible plastic tubing, such as semi-rigid polyethylene tubing, as are well known in the art. Such fittings 64a–d simplify fluid connections and are self-closing to remain pressure tight when disconnected. The fittings 64a–d may be color coded for ease of recognition when installing the modular membrane pressurization unit 14 into the housing 12.

As best shown in FIG. 2, a pair of lines 47a,b are coupled in fluid communication with fittings 64a, 64b, respectively, and extend downwardly into a protective conduit 40. Conduit 40, which may be buried entirely beneath ground level 18, enters the lower compartment 69 of the housing 12 upwardly through open bottom 17 in a direction from beneath the ground surface 18. The lines 47a,b deliver the dry pressurized air below ground level 18 through conduit 40 to the underground air space (not shown). It is appreciated that conduit 40 and lines 47a,b may exit beneath housing 12 in any of multiple directions as shown in phantom lines in FIG. 2, including vertically downward to an underlying air space, without departing from the spirit and scope of the present invention.

With continued reference to FIGS. 1–3, the modular membrane pressurization unit 14 further includes thermostatically-controlled heater elements 58 positioned proximate to the filters 71, 72. The heater elements 58 are energized when the ambient temperature surrounding the system 10 drops to near the freezing point of water. The heater elements 58, which typically operate under thermostatic control and by resistive or Joule heating, prevent the freezing of water carried by the compressed air stream from the compressor 70 as the air stream enters the filters 71, 72. The operation of the fans 44, may also be controlled with a thermostat.

The modular membrane pressurization unit 14 further includes a compressor control module 46 operative for controlling the compressor 70. The control module 46 has an instrument cluster 48 that includes a power switch 50, a circuit breaker 52, a run time meter 54, a pressure gauge 56 and other indicators and switches that are required to operate and control compressor 70. The compressor control module 46 might also include alarm indicators 59 to warn a user of various conditions. Each of the alarm indicators 59 may be any suitable light-emitting diode (LEDs) or lamp. An alarm connection for pressure sensor 73 is provided among the connections of a terminal set 60. Power for the unit 14 is provided via a terminal set 62.

Figure 4:
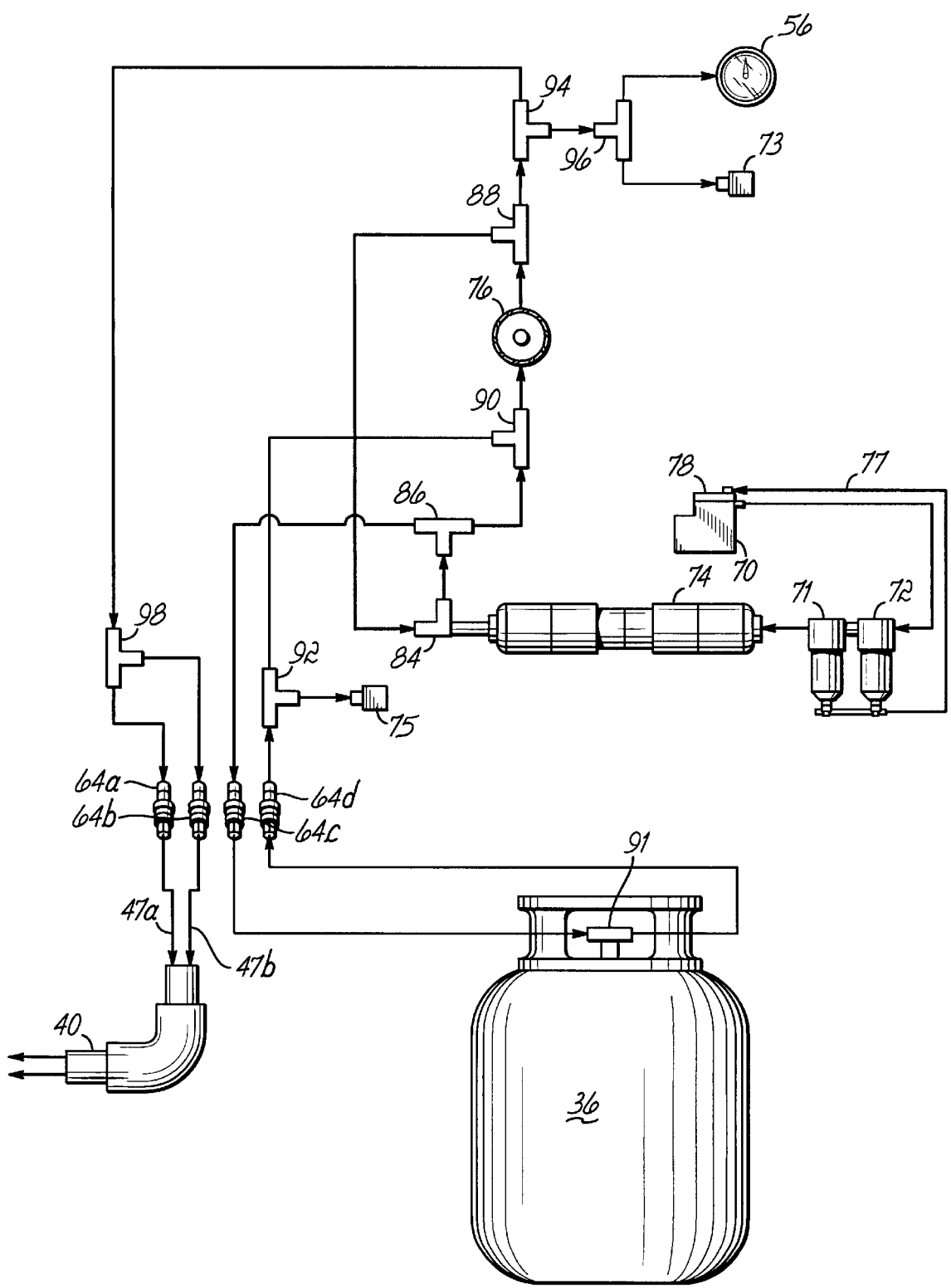
FIG. 4 is a simplified pneumatic circuit illustrating one embodiment of a membrane pressurization system.

With reference to FIG. 4, a pneumatic flow diagram for the modular membrane pressurization unit 14 of the present invention is depicted. Reference numerals in FIG. 4 designate corresponding structures previously described with reference to FIGS. 1–3. Compressor 70 intakes ambient air at atmospheric pressure from upper compartment 67 (FIG. 2) and provides a stream of compressed ambient air to the sequential filters 71, 72, which remove water and other contamination from the compressed air stream. Condensed water collected by the filters 71, 72 is conveyed via a drain line 77 to an evaporation tray 78 located on top of the compressor 70 for evaporative dissipation. Dried air from the outlet side of filters 71, 72 is transported to the inlet side of membrane dryer 74, which removes additional moisture and other gaseous species, such as oxygen.

Exiting from the outlet side of membrane dryer 74 is a flow of clean dry pressurized air, which is directed to one inlet of a three-way fitting 84. The outlet of three-way fitting 84 conveys dry pressurized air to an inlet of three-way fitting 86. One outlet of three-way fitting 86 directs dry pressurized air to the pressure regulator 76 and the other outlet of three-way fitting 86 is coupled in fluid communication with fitting 64c. The fitting 64c is pneumatically coupled with an inlet of a three-way fitting 91 of the air reservoir 36. One outlet of three-way fitting 91 directs dry pressurized air for storage within the air reservoir 36 and the other outlet of three-way fitting 91 is coupled in fluid communication with fitting 64d. Fitting 64d is coupled in fluid communication with an inlet of a three-way fitting 92. One outlet of three-way fitting 92 is coupled in fluid communication with the pressure switch 75. The pressure switch 75 is operative for cyclically energizing and de-energizing the compressor 70 as the system pressure falls and rises so as to maintain a constant system pressure. The other outlet of three-way fitting 92 is coupled in fluid communication with a The other outlet of three-way fitting 90 positioned between three-way fitting 86 and pressure regulator 76.

Pressurized dry air is provided from an outlet side of pressure regulator 76 to an inlet side of three-way fitting 88, which divides the air through one outlet to an inlet of three-way fitting 94 and the other outlet to a second inlet of three-way fitting 84. The flow to fitting 84 forms a feedback loop on the outlet side of the membrane dryer 74. During an off cycle of the compressor 70, the feedback loop supplies air from the air reservoir 36 back through the fitting 84 of the membrane dryer 74 to maintain positive air pressure on the dryer 74, thereby preventing the migration of water vapor and other molecules into the membrane walls forming the membrane dryer 74. This ensures dry air will be present initially at the outlet of the membrane dryer 74 when the compressor 70 cycles on.

The outlets of three-way fitting 94 feed dry pressurized air to three-way fittings 96 and 98. One outlet of three-way fitting 96 feeds pressure gauge 56 in the instrument cluster 48 and the other outlet of fitting 96 feeds pressure sensor 73, which is configured as a low pressure alarm. Three-way fitting 98 directs a flow of dry pressurized air to the two fittings 64a, 64b for delivering a flow of dry pressurized air underground through lines 47a,b.

In use and with reference to FIGS. 1–4, the base 16 of housing 12 is at least partially buried in the ground below the ground surface 18. Cover 26 is removed from the base 16 to provide an unobstucted access opening into the upper compartment 67. The modular membrane pressurization unit 14 is installed into the housing 12 by grasping the handholds 42 and manually inserting unit 14 through the access opening into the upper compartment 67. Engagement between the locating structures 38, 39 aligns the modular membrane pressurization unit 14 relative to base 16. Fittings 64a–d are interconnected to couple the modular membrane pressurization unit 14 in fluid communication with the lines 47a,b and the air reservoir 36 and suitable electrical connections are provided via terminals 60, 62.

Air moving device 44 draws in air from the surrounding environment through the air intake 24 into upper compartment 67. Air moving device 45, if present, forces air out of the air exhaust 25 so as to create a flow of ambient air through upper compartment 67. The compressor 70 draws ambient air present at atmospheric pressure and ambient humidity from upper compartment 67 into an inlet side and supplies a compressed stream of ambient air from an outlet side of compressor 70 to an inlet side of filters 71, 72. Filters 71, 72 remove particulates and moisture from the air stream. The air exiting from filter 72 is provided to the membrane dryer 74, which removes additional moisture to further dry the stream of air. Air from the outlet side of membrane dryer 74 is routed through the remaining components of the pneumatic circuit, as described above with regard to FIG. 4, provided in a regulated manner to the lines 47a,b and subsequently directed to the underground space.

Figure 5:
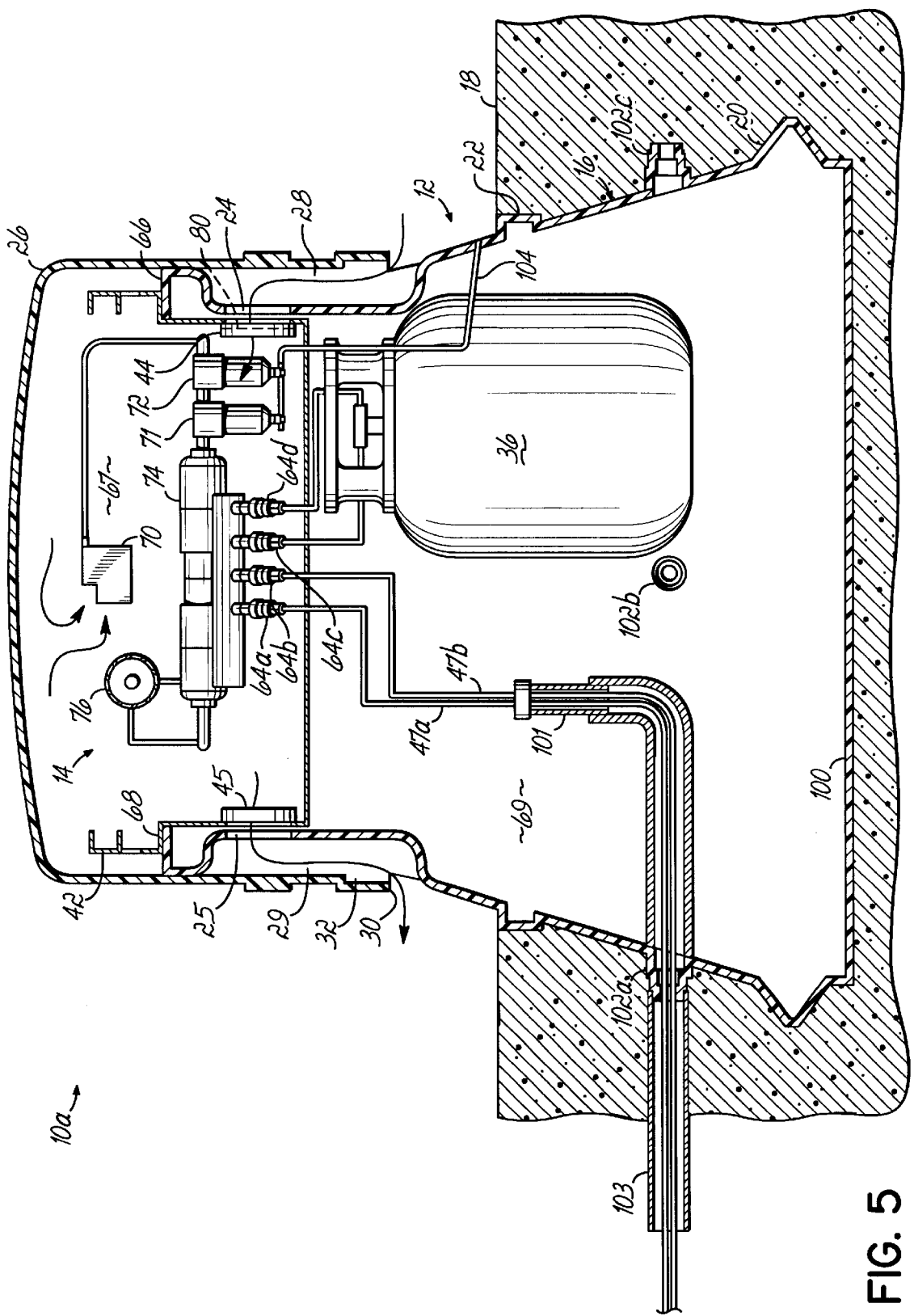
FIG. 5 is a side sectional view of another embodiment of a membrane pressurization system in accordance with aspects of the present invention.

With reference to FIG. 5 in which like reference numerals refer to like features, an alternative embodiment of a membrane pressurization system 10a in accordance with the present invention is illustrated. A bottom wall 100 is incorporated into base 16 of housing 12 that closes lower compartment 69 and thereby isolates lower compartment 69 from the surrounding ground. The air lines 47a,b are routed into a conduit 101 positioned inside lower compartment 69. Conduit 101 extends to attached to an inlet side of a conduit port 102a formed in base 16. Conduit 103, which is buried beneath the ground surface 18 and leads to the underground air space (not shown) is attached to an outlet side of conduit port 102a. The outlet side of the conduit port 102a may be diametrically stepped, as shown in FIG. 5, to permit the selective attachment of one of multiple different sizes of conduit 103, as is commonly used in the art. To that end, an end portion of the outlet side of the conduit port 102a is trimmed or excised to conform port 102a diametrically for receiving a given diameter of conduit 40. However, the present invention is not so limited and the outlet side of the conduit port 102a may have a uniform outer diameter.

It is appreciated that base 16 may serve as a junction box if provided with additional conduit ports 102b, 102c arranged in a spaced-apart relationship. The conduit ports 102b, 102c allow ingress and egress of air and power lines from respective conduits (not shown) into the lower compartment 69 of housing 12. The conduit ports 102b, 102c may be oriented so that housing 12 serves as a right angle junction box, as illustrated if FIG. 5, or may be positioned in the side walls of base 16 to be aligned so that housing 12 serves as an in-line junction box. Those skilled in the art will recognize that other formations of the base 16 with appropriate conduit ports 102a–c formed therein allow the base 16 to serve as any commonly available junction box known in the art.

FIG. 5 also illustrates an alternative method of disposing of the water removed from the pressurized air and collected in filters 71, 72. Specifically, a shared drain line 104 is coupled in fluid communication with respective drains in filters 71, 72. The drain line 104 is routed within the upper and lower compartments 67, 69 to an opening in the base 16 for deposit outside of the housing 12 onto the ground surface 18. It is appreciated that the drain line 104 may be routed entirely in upper compartment 67 without departing from the spirit and scope of the present invention.

Figure 6:
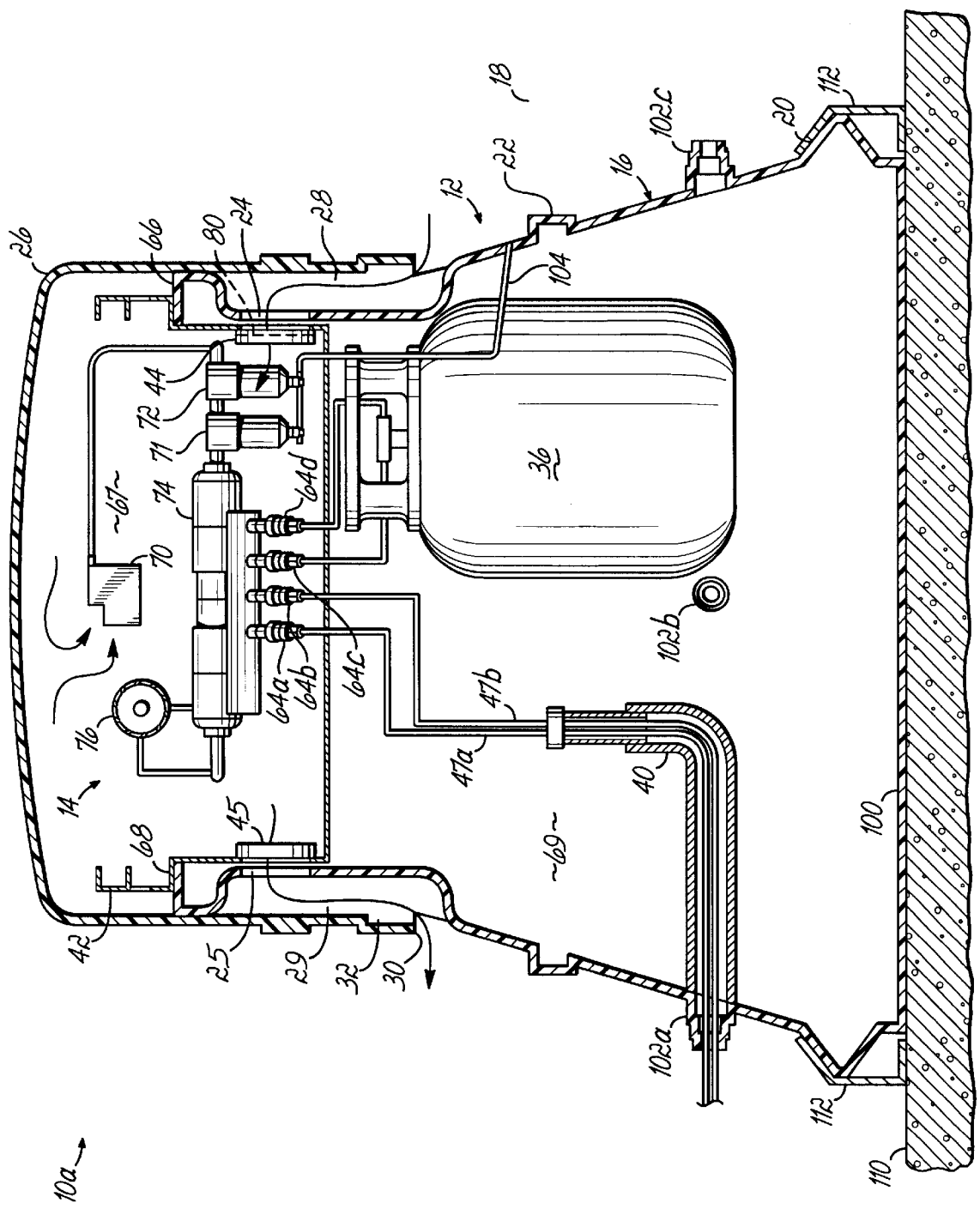
FIG. 6 is a side sectional view of another embodiment of a membrane pressurization system in accordance with aspects of the present invention.

With reference to FIG. 6 in which like reference numerals refer to like features, membrane pressurization system 10a may also be disposed on an above-ground support platform 110, such as a concrete slab, in accordance with the principles of the present invention. The bottom wall 100 of housing 12 contacts and is supported by an upper surface of support structure 110. System 10a is stabilized against unintentional lateral movement relative to support platform 110 by one or more brackets 112. Due to the presence of bottom wall 100, the system 10a may be positioned entirely above the ground surface 18 as well as being partially buried. It is apparent that system 10a may be either partially buried beneath ground level 18, as shown in FIG. 5, or positioned on support platform 110 above the ground surface 18, as shown in FIG. 6.

Figure 7:
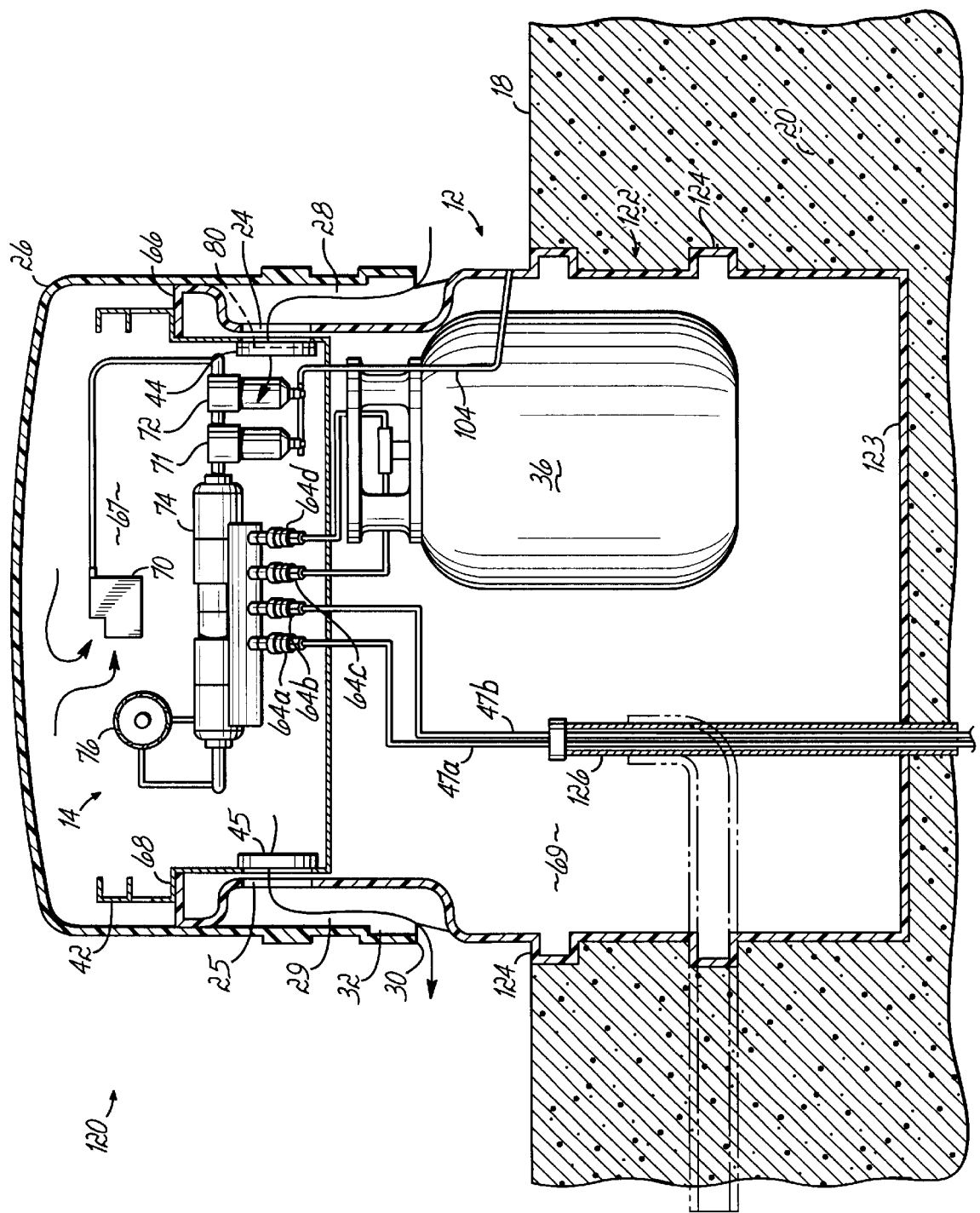
FIG. 7 is a side sectional view of another embodiment of a membrane pressurization system in accordance with aspects of the present invention.

With reference to FIG. 7 in which like reference numerals refer to like features, a membrane pressurization system 120 has a base 122 with a buried portion beneath the ground surface 18. The buried portion of base 122 has a substantially uniform diameter and the lower compartment 69 is enclosed by a bottom 123. Base 122 includes a plurality of, for example, two circumferential ribs 124 that, when base 122 is buried, strengthen and stabilize the base 122 and aid in securing the base 122 within the ground. A conduit 126, conveying lines 47a,b, is illustrated as extending vertically downward relative to the ground surface 18 through an suitably dimensioned opening provided in the bottom wall 100 for routing lines 47a,b to an underlying air space (not shown). Alternatively, the conduit 126 may be routed laterally relative to the ground surface 18 and through an opening formed in a side portion of the base 122, as shown in phantom lines in FIG. 7.

Figure 8:
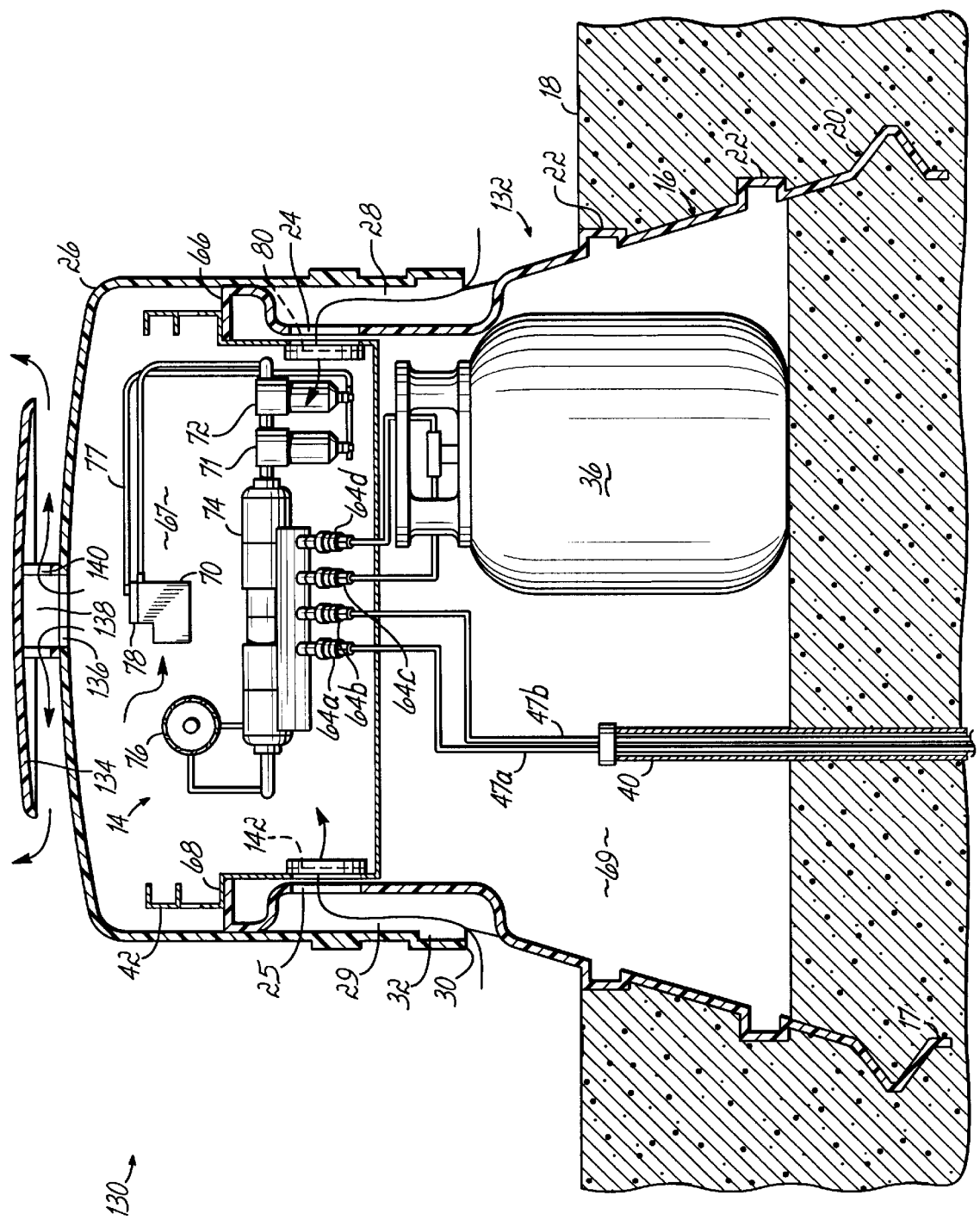
FIG. 8 is a side sectional view of another embodiment of a membrane pressurization system in accordance with aspects of the present invention.

With reference to FIG. 8 in which like reference numerals refer to like features, a membrane pressurization system 130 has a housing 132 modified to permit ventilation of the upper space 67 by the air movement induced by convection and not with the forced assistance of one or more air moving devices, such as air moving devices 44, 45 (FIGS. 1–3, 5–6). Specifically, system 130 includes an upper cover 134 attached to housing 132 and positioned above the ground surface 18. Upper cover 134 is adapted for absorbing significant amounts of solar radiation during daylight hours and when illuminated. For example, upper cover 134 may be formed of, or may have an outer coating, of a dark-colored material suitable pigmented for absorbing radiation. Heat is transferred from the upper cover 134, when heated, to the air within the upper compartment 67. The heated air within in upper compartment 67 rises and exits through an opening 136 in housing 132 into a flow passage 138. Openings 140 are provided in the flow passage 138 through which the heated air is exhausted to the surrounding environment. Cool ambient air enters the air intake 24 and the air exhaust 25 to replace the heated air and, thereby, establishes a convective air flow within upper compartment 67. In addition to filter element 80 on air intake 24, another filter element 142, similar to filter element 80, is provided on air exhaust 25.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art.

The invention itself should only be defined by the appended claims, wherein we claim:

1. A system for supplying dry pressurized air to an underground air space, comprising:
    a housing having a portion adapted to be buried beneath a ground surface and including an interior space and an air intake above the ground surface adapted to receive ambient air into the interior space; and
    a modular membrane pressurization unit configured to be removably received in said interior space of said housing, said modular membrane pressurization unit engaging the housing to form an upper and a lower compartment of the housing, the modular membrane pressurization unit including an air inlet coupled in fluid communication with said air intake in the housing upper compartment and an air outlet coupled in fluid communication with the underground air space through the housing lower compartment, said pressurization unit operative to reduce a moisture level of ambient air flowing from said air inlet to said air outlet to provide dry pressurized air to the underground air space.

2. The system of claim 1 further comprising an air reservoir coupled in fluid communication with said modular membrane pressurization unit, said air reservoir capable of storing a volume of the dry pressurized air.

3. The system of claim 1 wherein said housing includes a base and a cover mounted to said base, said cover removably attached to said base so as to provide an access opening into said interior space of said housing for installation of said modular membrane pressurization unit.

4. The system of claim 3 wherein said cover has a portion that shields said air intake against the entrance of contamination.

5. The system of claim 3 wherein said buried portion of said base includes a flared section extending downwardly from the ground surface.

6. The system of claim 3 wherein said base includes a plurality of circumferential ribs adapted to strengthen and stabilize said base.

7. The system of claim 3 wherein said base further includes an interior ledge for supporting said modular membrane pressurization unit when said modular membrane pressurization unit is disposed in said housing.

8. The system of claim 1 wherein said modular membrane pressurization unit includes a first locating structure and said housing includes a second locating structure complementary to said first locating structure, said first and second locating structures adapted to engage for orienting said modular membrane pressurization unit in said housing.

9. The system of claim 1 wherein said modular membrane pressurization unit includes an air moving device coupled with said air intake, said air moving device operative to suction ambient air from the environment surrounding said housing through said air intake into said interior space.

10. The system of claim 9 wherein said air moving device includes a filter media associated with said air moving device, said filter media operative to remove particulate matter from said ambient air entering said air intake.

11. This system of claim 1 wherein said modular membrane pressurization module includes a handhold adapted for installing and removing said modular membrane pressurization unit from said housing.

12. The system of claim 1 wherein said modular membrane pressurization unit is adapted to be installed and removed from said housing free of tools.

13. The system of claim 1 wherein the modular membrane pressurization unit includes a heater element, said heater element being thermostatically controlled to elevate the temperature within said interior space.

14. The system of claim 1 wherein said housing includes a first conduit port and tubing coupling said air outlet of said modular membrane pressurization unit in fluid communication with the underground air space, said tubing routed from said interior space of said housing to an exterior of said housing through said first conduit port.

15. The system of claim 1 wherein said housing includes second and third conduit ports that allow pathways into said interior space of said housing so that said housing is capable of serving as a junction box.

16. The system of claim 1 wherein said base of said housing is adapted so that said housing may be optionally positioned above the ground surface on a support platform.

17. A method of supplying dry pressurized air comprising:
    intaking ambient air from above a ground surface into an upper compartment of a housing having a portion buried beneath the ground surface;
    directing the ambient air in the upper compartment to a modular membrane pressurization unit positioned inside the housing and engaging the housing to separate a lower compartment of the housing from the upper compartment;
    passing the ambient air through a membrane separator of the modular membrane pressurization unit to remove moisture for providing dried air with a reduced moisture level; and
    directing the dried air into the lower compartment and below the ground surface to an underground air space.

18. The method of claim 17 further comprises compressing the ambient air to provide a pressurized flow to the membrane separator.

19. The method of claim 18 further comprising filtering the pressurized flow to remove particulate matter and moisture before passing the ambient air through the membrane separator.

20. A system for supplying dry pressurized air to an underground air space, comprising:
    a housing including a base and a removable cover and having a portion adapted to be buried beneath a ground surface, the housing including an interior space and an air intake above the ground surface adapted to receive ambient air into the interior space;
    the base including a plurality of ribs adapted to strengthen and stabilize the base; and a modular membrane pressurization unit configured to be removably received in said interior space of said housing, said modular membrane pressurization unit including an air inlet coupled in fluid communication with said air intake and an air outlet coupled in fluid communication with the underground air space, said pressurization unit operative to reduce a moisture level of ambient air flowing from said air inlet to said air outlet to provide dry pressurized air to the underground air space.

21. A system for supplying dry pressurized air to an underground air space, comprising:

a housing having a portion adapted to be buried beneath a ground surface and including an interior space and an air intake above the ground surface adapted to receive ambient air into the interior space;

a modular membrane pressurization unit configured to be removably received in said interior space of said housing, said modular membrane pressurization unit including an air inlet coupled in fluid communication with said air intake and an air outlet coupled in fluid communication with the underground air space, said pressurization unit operative to reduce a moisture level of ambient air flowing from said air inlet to said air outlet to provide dry pressurized air to the underground air space;

the modular membrane pressurization unit including a first locating structure and the housing including a second locating structure complementary to the first locating structure for orienting the pressurization unit in the housing.

22. A system for supplying dry pressurized air to an underground air space, comprising:

a housing having a portion adapted to be buried beneath a ground surface and including an interior space and an air intake above the ground surface adapted to receive ambient air into the interior space; and a modular membrane pressurization unit configured to be removably received in said interior space of said housing, said modular membrane pressurization unit including an air inlet coupled in fluid communication with said air intake and an air outlet coupled in fluid communication with the underground air space, said pressurization unit operative to reduce a moisture level of ambient air flowing from said air inlet to said air outlet to provide dry pressurized air to the underground air space the modular membrane pressurization unit being adapted to be received and removed from the housing generally free of tools.

23. The system of claim 1 wherein said housing includes a portion having a dark colored material for absorbing heat to heat air in the interior space.

* * * * *